3,009,806
HERBICIDAL COMPOUNDS AND METHOD FOR CONTROLLING BROADLEAF AND GRASSY WEEDS THEREWITH

Edward D. Weil, Niagara Falls, Edwin Dorfman, Grand Island, and Jerome Linder, Niagara Falls, N.Y., assignors to Hooker Chemical Corporation, Niagara Falls, N.Y., a corporation of New York
No Drawing. Filed Aug. 13, 1958, Ser. No. 754,707
4 Claims. (Cl. 71—2.6)

This invention relates to compositions of matter known as ring chlorinated and nitrated phenylacetic acids. More particularly this invention relates to new compositions of matter comprising dichloronitrophenylacetic acids, trichloronitrophenylacetic acids and mixtures thereof where the position on the phenyl ring para to the carboxymethyl group is unsubstituted.

In order that the invention be more easily understood it will be described with reference to a general formula. The compounds of this invention may be represented by the following general formula:

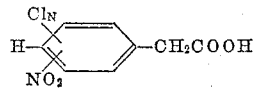

where N is from 2 to 3 inclusive, where $Cl_N$ represents chlorine atom substituents on the phenyl ring ortho or meta (not para) to the carboxymethyl group, and $NO_2$ represents a nitro group on the phenyl ring ortho or meta (not para) to the carboxymethyl group. Alternately, the invention may also be described as: a compound having the formula:

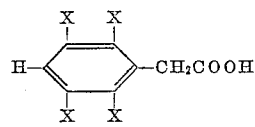

wherein X is selected from the group consisting of H, Cl and $NO_2$ and wherein one of the X's is $NO_2$ and at least two of the X's are Cl.

It is important in agricultural practices to use a plant growth regulator which will control weeds but which will have little or no adverse effect on the crops in the treated area. We have found that the compounds of this invention when used as plant growth regulators accomplish this need.

Although many herbicides have been developed in the last two decades, two notable problems have still remained. One is the selective control of common broadleaf annual weeds in the broad-leaf crops such as soybeans, carrots, tomatoes, and other vegetables without damage to the crops, and at a reasonable cost. The second problem has been control of annual grass weeds, which tend to be resistant to common herbicides such as 2,4-D and susceptible only to those post-emergence herbicides which would cause a serious degree of damage to the above-mentioned crops. Also, in regard to turf, it has been a persistent problem to find a herbicide which will selectively control crabgrass without turf injury.

The compounds of this invention provide herbicides and methods for use thereof which will selectively accomplish control of both broad-leaf weeds and annual grasses without damage to certain desirable plant species.

Illustrative of the compounds of this invention represented by the general formula above are: 2,3,6-trichloro-5-nitro-phenylacetic acid, 2,3,5-trichloro-6-nitrophenylacetic acid, 2,3-dichloro-5-nitrophenylacetic acid, 2,3-dichloro-6-nitrophenylacetic acid, 2,5-dichloro-3-nitrophenylacetic acid, 2,5-dichloro-6-nitrophenylacetic acid, and 2,6-dichloro-3-nitrophenylacetic acid. Also included within the scope of the invention are the salts, esters, amides and chlorides of these acids, it being evident that such derivatives are capable of hydrolyzing to the parent acids. Also included are mixtures containing at least two of the above acids, or hydrolyzable derivatives thereof.

Said mixtures may also contain isomers having a chlorine or nitro group in a para position, to avoid costly separation, it being found that such isomers have relatively small herbicidal activity or some small synergising action on the active compounds of the invention.

Methods of preparing the compounds of this invention are illustrated by the following examples.

EXAMPLE 1

*Preparation of 2,3,6-trichloro-5-nitrophenylacetic acid*

A mixture of twenty-five parts of 2,3,6-trichlorophenylacetic acid, the preparation of which is described in our co-pending application S.N. 692,046, filed October 24, 1957, and now abandoned, with one hundred and fifty parts of red fuming nitric acid is allowed to stand at ambient temperature for four hours. An equal volume of water is then added, the mixture is filtered, and washed free of nitric acid.

The pale yellow crystalline product after drying in air to a constant weight (twenty-six grams) is found to be of adequate purity for use. The melting point is 184.5–185.5 degrees centigrade and the neutralization equivalent (by titration with 0.1 N sodium hydroxide to a phenolphthalein end point) is two hundred and eighty-five (theory, 284.5).

*Analysis.*—Calcd. for $C_8H_4Cl_3NO_4$: N, 4.92; Cl, 37.5. Found: N, 4.77; Cl, 36.6.

The product may be recrystallized, if desired, from aqueous alcohol to give a purer product melting at one hundred and eighty-five to one hundred and eighty-six degrees centigrade.

The structure was proved by oxidation by potassium permanganate to 2,3,6-trichloro-5-nitro benzoic acid, M.P. 156.5–7 degrees centigrade, which is described in our co-pending application S.N. 740,992.

EXAMPLE 2

*Preparation of technical dichloronitrophenylacetic acid*

Fifty parts of a mixed dichlorophenylacetic acid having the approximate isomeric composition thirty-seven percent 2,5-, twenty-seven percent 2,6-, forty-four percent 2,4-, and eight percent 3,4-dichloro- (based on infrared analysis of the dichlorotoluenes from which it was derived), was mixed with four hundred and fifty parts of red fuming nitric acid and allowed to stand at room temperature for twenty-four hours. The product was isolated as in Example 1, and was a yellowish crystalline solid having a neutralization equivalent of two hundred and fifty (theory, two hundred and fifty-two).

EXAMPLE 3

*Preparation of technical trichloronitrophenylacetic acid*

Fifty parts of a mixed trichlorophenylacetic acid having the approximate isomeric composition forty to fifty percent 2,3,6-, thirty to forty percent 2,4,5-, and ten to twenty percent 2,3,5-trichlorophenylacetic acid (based on infrared analysis of the trichlorotoluenes from which it was derived), was mixed with three hundred and seventy-five parts of red fuming nitric acid and allowed to stand at room temperature for twenty-four hours. The product was isolated as in Example 1, and was a yellowish, crystalline solid having a neutralization equivalent of 283.5 (theory, 284.5).

*Analysis.*—Calcd. for $C_8H_4Cl_3NO_4$: N, 4.92; Cl, 37.5. Found: N, 4.5; Cl, 37.0.

These above examples illustrate specifically the preferred embodiments of our invention.

While we prefer for reasons of cost to formulate the compounds of the invention as water soluble salts, such as the sodium or ammonium, or alkyl-substituted ammonium salts, these compounds may also be used in the pure form or dissolved in an organic solvent such as xylene, kerosene, alcohols, or ketones, or admixed with a solid carrier such as clay or vermiculite. Formulation adjuvants such as wetting agents, suspending agents, dispersing agents, emulsifiers, sequestering agents, and the like may be employed in accordance with the familiar practices of the herbicide art.

An example of a typical formulation of this invention is shown below.

EXAMPLE 4

*Formulation of 2,3,6-trichloro-5-nitrophenylacetic acid*

To a stirred mixture of ten parts of 2,3,6-trichlorophenylacetic acid and fifty to seventy-five parts of water was added five percent sodium hydroxide until a pH of nine was reached, and the mixture then diluted with water to a total of two hundred parts. The result was a clear solution, containing five percent by weight of equivalent acid as the sodium salt. Solutions of the dimethylammonium salt were made similarly.

The compounds of the invention are preferably applied to the area wherein weed control is desired prior to emergence of the weeds, but may also be applied subsequent to weed emergence. However, since the compounds of the invention tend to be slower-acting than may be desired when they are applied to certain already well-established weeds, it may be found advantageous in some applications to use them in admixture or conjunction with certain faster acting herbicides, exemplified by aminotriazole, 2,4-dichlorophenoxyacetic acid, or related phenoxyacetic acids, 2,4-dinitro-6-alkyl phenols, trichloroacetic acid and its derivatives, 2,2-dichloropropionic acid and its derivatives, sodium chlorate, pentachlorophenol, or herbicidal petroleum oils. This list is representative only, and other fast-acting hormonal or contact herbicides may be so employed also. Such combinations frequently give the appearance of synergism, since neither the fast-acting short-lived herbicide nor the slower-acting long-lived herbicide alone will perform as well as the combination where both pre-existing and subsequently-emerging weeds are to be controlled.

EXAMPLE 5

Field plots in a farmed area infested with annual broad-leaf weeds (principally lambsquarters and ragweed), and a variety of annual grasses was plowed, disked, and planted with soybeans, snap beans, and sweet corn. Within two days after planting, the plots were sprayed with various chemicals as listed below. When inspected, approximately one month later, the results were as presented in Table I.

*Table I*

| Chemical | Rate (lbs./acre) | Broadleaf weeds (average) | Annual grasses (average) | Sweet corn | Snap beans | Soybeans |
|---|---|---|---|---|---|---|
| 2,3,6-trichlorophenylacetic acid | 2 | 10 | 10 | 10 | 10 | 10 |
| Do | 4 | 10 | 10 | 10 | 10 | 10 |
| Do | 8 | 10 | 10 | 10 | 10 | 10 |
| 2,3,6-trichloro-5-nitrophenylacetic acid | 2 | 4 | 5 | 0 | 0 | 0 |
| Do | 4 | 9 | 6-7 | 0 | 1 | 0 |
| Do | 8 | 9-10 | 9-10 | 0 | 5 | 0 |
| Techn. trichloronitrophenylacetic acid | 2 | 3 | 5 | 0 | 0-1 | 0 |
| Do | 4 | 5 | 7 | 0 | 3 | 0 |
| Do | 8 | 9 | 9 | 0 | 3 | 1 |
| Techn. dichloronitrophenylacetic acid | 4 | 5-6 | 9 | 0 | 2 | 0 |
| Do | 8 | 8-9 | 8-9 | 0 | 3 | 1 |

Scale: 0=no effect; 1=trace repression; 2-8=increasing degrees of repression and damage; 9=almost complete elimination; 10=100% elimination.

The compounds of the invention are also useful as chemical intermediates. Reduction of the compounds, depending on conditions, yields the corresponding amino-, hydroxylamino-, azo-, and azoxy-substituted di- or trichlorophenylacetic acids, which have plant growth regulating properties. The preparation of the compounds of our invention is preferably done by nitration of the corresponding di- or trichlorophenylacetic acids by any of the nitration procedures well known to the art.

The above examples are intended to be representative, and it is understood that other reasonable ramifications and variations may be used. The examples and methods of preparation disclosed have been given for purposes of illustration only and do not restrict the invention to the specifics herein illustrated. Many other modifications and ramifications will naturally suggest themselves to those skilled in the art, based on the disclosure of the basic discovery. These are intended to be comprehended within the scope of our invention.

We claim:

1. A method for the selective control of broadleaf and grassy weeds in crops which comprises applying to the locus to be treated a phytotoxic amount of a compound selected from the group consisting of 2,3,6-trichloro-5-nitrophenylacetic acid and its sodium, ammonium, and dimethylammonium salts.

2. 2,3,6-trichloro-5-nitrophenylacetic acid.

3. Sodium 2,3,6-trichloro-5-nitrophenylacetate.

4. Dimethylammonium 2,3,6-trichloro-5-nitrophenylacetate.

References Cited in the file of this patent

UNITED STATES PATENTS

| 2,394,916 | Jones | Feb. 12, 1946 |
| 2,577,969 | Jones | Dec. 11, 1951 |
| 2,905,706 | Sims et al. | Sept. 22, 1959 |

OTHER REFERENCES

Zimmerman et al., in "Chemical Abstracts," vol. 46, col. 11547, 1952.